(12) United States Patent
Yoo et al.

(10) Patent No.: US 6,907,078 B2
(45) Date of Patent: Jun. 14, 2005

(54) METHOD FOR STORING COMPRESSED MPEG IMAGE WITH LOW POWER CONSUMPTION AND FRAME BUFFER STRUCTURE USED IN THE SAME

(75) Inventors: Hoi-Jun Yoo, Taejon (KR); Chi-Weon Yoon, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 712 days.

(21) Appl. No.: 10/055,916

(22) Filed: Jan. 28, 2002

(65) Prior Publication Data

US 2002/0101931 A1 Aug. 1, 2002

(30) Foreign Application Priority Data

Jan. 29, 2001 (KR) .......................................... 2001-4015

(51) Int. Cl.⁷ ................................................. H04N 7/12
(52) U.S. Cl. ................................................. 375/240.24
(58) Field of Search ......................... 348/402.1, 390.1, 348/400.1, 699, 714, 395.1; 375/240.12, 240.24, 240.26, 240.17, 240.13

(56) References Cited

U.S. PATENT DOCUMENTS

| 5,912,676 | A | * | 6/1999 | Malladi et al. ............. 345/521 |
| 6,060,728 | A | | 5/2000 | Ghosh et al. |
| 6,690,727 | B1 | * | 2/2004 | Mehta ................... 375/240.12 |
| 2001/0022816 | A1 | * | 9/2001 | Bakhmutsky et al. .. 375/240.17 |

* cited by examiner

Primary Examiner—Chris Kelley
Assistant Examiner—Behrooz Senfi
(74) Attorney, Agent, or Firm—Oliff & Berridge, PLC

(57) ABSTRACT

Disclosed is a frame buffer structure having a sub-word line way of 9 banks in which a dispersed 9-tile mapping shaped data storing method and a partial activation for the method are possible, the frame buffer structure requiring a low power consumption, and a frame buffer being integrated with a logic to properly correspond to an application region to process an MPEG image signal. A method for storing a compressed MPEG image in the frame buffer, comprises: a first step of dividing an image frame into 8×8 pixels regions; a second step of re-designating the respective divided pixel regions into 9 adjacent blocks regions having a form of 3×3; a third step of mapping the 8×8 pixel regions consisting of the 9 adjacent blocks regions having the form of 3×3 into one column; and a fourth step of dispersion-storing the mapped 9 blocks regions of 8×8 pixel regions in different banks.

3 Claims, 3 Drawing Sheets

Memory Read/Write Operation (P MacroBlock)

Screen

Normal Operation

SAM Transfer

METHOD FOR STORING COMPRESSED MPEG IMAGE WITH LOW POWER CONSUMPTION AND FRAME BUFFER STRUCTURE USED IN THE SAME

BACKGROUND OF THE INVENTION

1. Field of the Invention

The present invention relates to a method for processing a compressed MPEG image and a frame buffer structure used in the method, and more particularly, to a frame buffer structure having a sub-word line way of 9 banks, in which dispersed 9-tiles mapping shaped data storing method and partial activation thereof are possible, the frame buffer structure requiring a low power consumption, and a frame buffer being integrated with a logic to properly correspond to an application region to process an MPEG image signal.

2. Description of the Related Art

Generally, current cultural society is rapidly developed toward a direction to satisfy desires of general consumers, and strongly exhibits a trend to newly lead or establish taste of consumers or consumption patterns.

These trends are carried out through development of new fashion or new product. These new products are being developed toward miniaturization, multifunction, high performance. In case of products related to the image signal process, rapid transmission of image signals and high definition are further requested.

Accordingly, in order to satisfy these requirements, there was provided the MPEG (Moving picture experts group) image compression technology. The aforementioned MPEG image compression technology is being used in many various fields, and standards thereof are respectively specified depending on appliances to be objected.

MPEG-1 image compression technology is a technology to target an image process in an environment where a data band width of 1.5 Mbps or so is given, and pursues to enhance a picture quality in a video CD (Compact disk) by reading out data through CD-ROM (Compact disk-Read only memory).

MPEG-2 image compression technology was designed for high definition digital television (HDTV). Accordingly, MPEG-2 technology requires much larger data band width and high computational performance in data processing logic compared with the MPEG-1. Until now, most of hardware related to MPEG image processing mainly pursues high performance and optimization of algorithm, and is targeted to MPEG-2 standard.

Meanwhile, a new image compression standard, MPEG-4 is targeted to an image processing based on mobile telecommunications environment having a relatively very low band width of a few ten—a few hundred Kbps, and final draft thereof is being specified recently. It is anticipated that MPEG-4 is being applied to various appliances, largely due to the commercialization of a massive capacity mobile telecommunications environments such as IMT-2000.

Accordingly, if new image standard is targeted to the handheld information telecommunications field, it can be realized by a not so high data processing capability. A hardware for supporting this new standard is important to pursue a low power consumption appropriate for properties of handheld apparatus rather than a high performance.

With the growth of the foregoing MPEG image compression technologies, very active changes are occurring even in semiconductor technologies. As one example, EML (Embedded memory logic) technology in which memory and logic are integrated in a single chip is one important method to realize an SOC (System on a chip). Especially, by integrating a DRAM of a memory device together with a logic, a very high band width can be obtained in comparison with a system in which the two elements are separated, and a high data processing performance is obtained together.

Further, with the necessity of an input/output (I/O) operation of an external data for a memory access, it becomes possible to transmit data through a small load within the chip, and to thus realize a low power consumption.

However, despite these technologies changes, smoothly watching an image through a handheld terminal in the handheld information telecommunications field is difficult and has a limit because of signal delay. Especially, in order to watch a smooth moving pictures using a current technology alone, a very high power consumption is requested to thereby cause many limits in carrying out the original function of the terminal itself.

In other words, in terms of personal communications that are main purpose of the handheld terminal, it is essential to guarantee a long standby time and a long calling time based on the low power consumption, whereas as current society is rapidly advanced toward information-oriented society, a data band width which can be processed by each of individuals is rapidly magnified and thereby a multimedia signal processing function is essentially requested to the handheld information apparatus. However, as aforementioned, there is a contradiction in that such the function needs high power consumption.

Also, it is on the rise as a problem to be essentially solved at the present when appliances are widely being applied to visual phone services such as IMT-2000.

SUMMARY OF THE INVENTION

Therefore, the present invention has been devised to solve the above problems, and it is an object of the present invention to provide a frame buffer structure having a sub-word line way of 9 banks in which a dispersed 9-tile mapping shaped data storing method and a partial activation for the method are possible, the frame buffer structure requiring a low power consumption, and a frame buffer being integrated with a logic to properly correspond to an application region to process an MPEG image signal.

To achieve an aforementioned object of the present invention, there is provided a method for storing a compressed MPEG image in a frame buffer, the method comprising: a first step of dividing an image frame into 8×8 pixels regions; a second step of re-designating the respective divided pixel regions into 9 adjacent blocks regions having a form of 3×3; a third step of mapping the 8×8 pixel regions consisting of the 9 adjacent blocks regions having the form of 3×3 into one column; and a fourth step of dispersion-storing the mapped 9 blocks regions of 8×8 pixel regions in different banks.

Preferably, the 64 pixels of 8×8 pixels regions each is comprised of three kinds of color information, Y/Cr/Cb expressed by 8 bits information, and the one column stores total 512 bits information, which corresponds to a color information size of one kind on the 8×8 pixels regions.

Meanwhile, in order to restore one macro block from a previous image, there is needed 9 blocks data in the most adjacent 3×3 blocks regions. At this time, since memory banks where the respective blocks are positioned are different from each other, there does not occur a collision between columns.

In another aspect of the present invention, there is provided a frame buffer structure which processes an image data depending on a partial activation way in which a partial activation-possible sub-word line is adapted to a frame buffer to activate and use a current necessary data alone.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Now, preferred embodiments of the present invention will be described in detail with reference to the annexed drawings.

Figure 1:
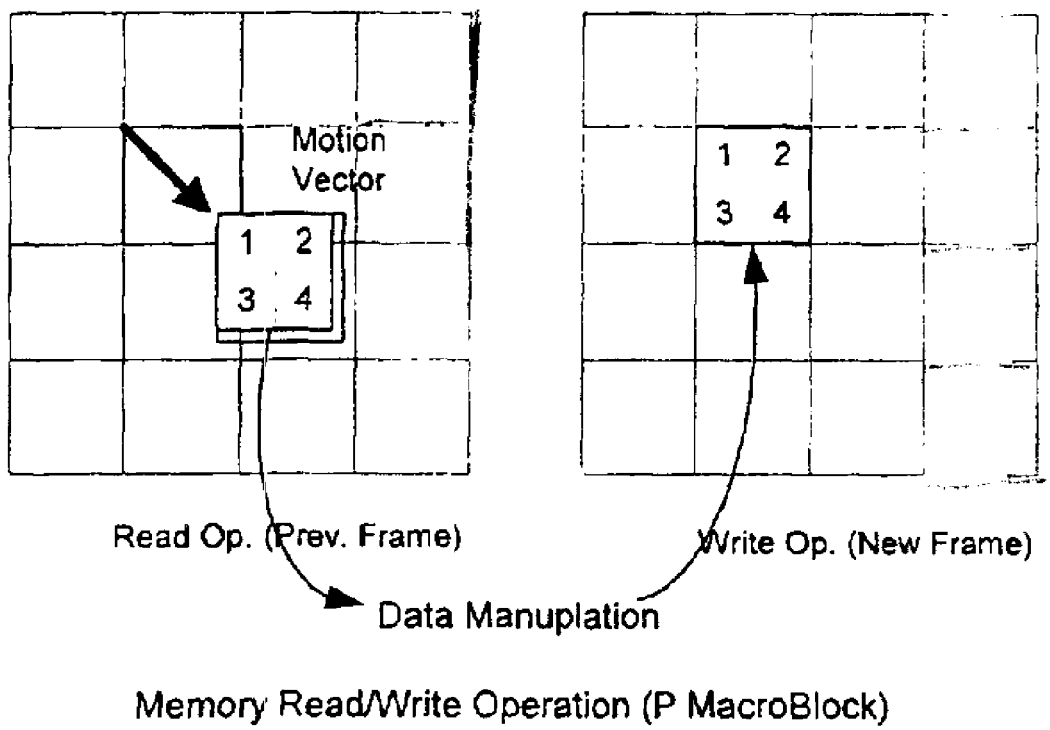
FIG. 1 is a schematic view for describing a data region which is requested in processing a P/B type of frame in an impressed MPEG image.

FIG. 1 shows a way of reading out an image information on a previous frame for a necessary motion compensation in processing an MPEG image and an operation of writing its result in a new frame after the motion compensation.

In FIG. 1, the block unit is expressed in 8×8 pixels. This is mainly generated when processing colors of Cr/Cb. In a process of Y color, most of cases sets a basic processing unit as a macro block having 16×16 pixels. However, in case of MPEG-4, it is sometimes necessary to process data in a pixel unit of 8×8.

Figure 2:
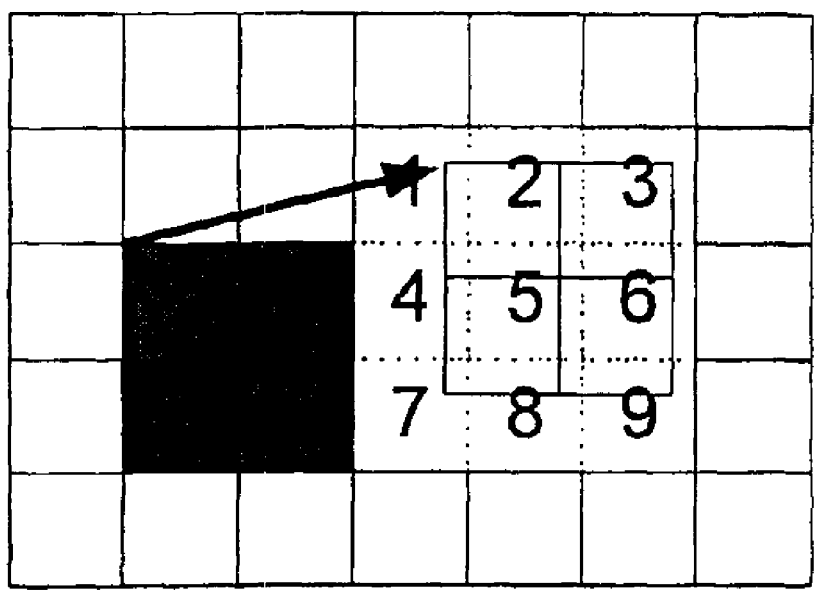
FIG. 2 is a schematic view for describing an image data region that is necessary for a previous frame content when a motion compensation is performed in a unit of macro block.

FIG. 2 is a view for showing number and shape of blocks of a previous frame that are necessary to process data in a pixel unit of 16×16 (4 number of 8×8 pixels blocks).

According to the property of the motion vector, there is needed 9 blocks at maximum, and the blocks are placed adjacent to each other. If the motion vector has a value of (0, 0), total 4 blocks alone is needed but this case hardly occurs. Values of the motion vectors are irregular.

Figure 3:
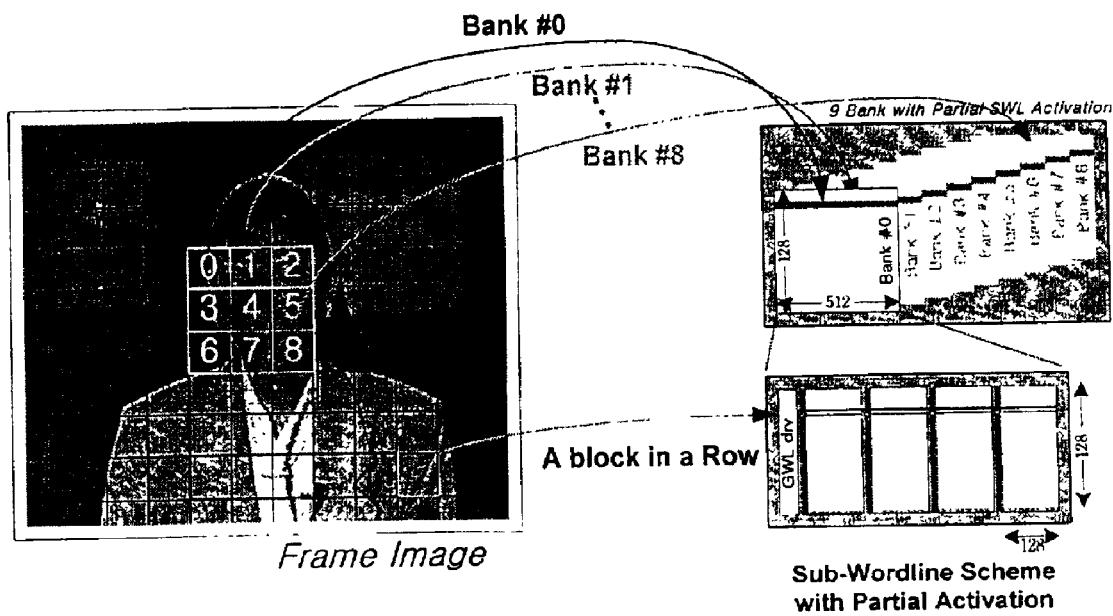
FIG. 3 is a view of a case in which an image is divided into blocks units having 8×8 pixels, and to which a 9-tiles mapping way in which the divided blocks are mapped in respective dispersed columns is applied, which describes a structure of a DRAM frame buffer according to the 9-tiles mapping way, the frame buffer having 9 banks and a sub-word line structure in which a partial activation is possible.

FIG. 3 shows a 9-tiles mapping way in which the structure of the frame buffer is optimized to be matched with a way of reading information on a previous frame, and thereby a low power consumption for reading and processing the previous frame information.

A single 8×8 pixels block is mapped to one column of a frame buffer comprised of a DRAM. Each pixel is expressed in 8 bits information, and accordingly one column stores total 512 bits information. Meanwhile, the 9 blocks adjacent to each other are mapped to different banks of the frame buffer.

In this case, when there is a need to read total 9 blocks data in order to process data having a macro block size, a collision between columns does not occur because the banks of the DRAM are different from each other. This removes an operation in which a column in active state due to collision between columns is made into non-active state upon processing one macro block, and then a new column is activated, so that a power consumption due to column cycle repeat is decreased in comparison with the conventional method.

Figure 4:
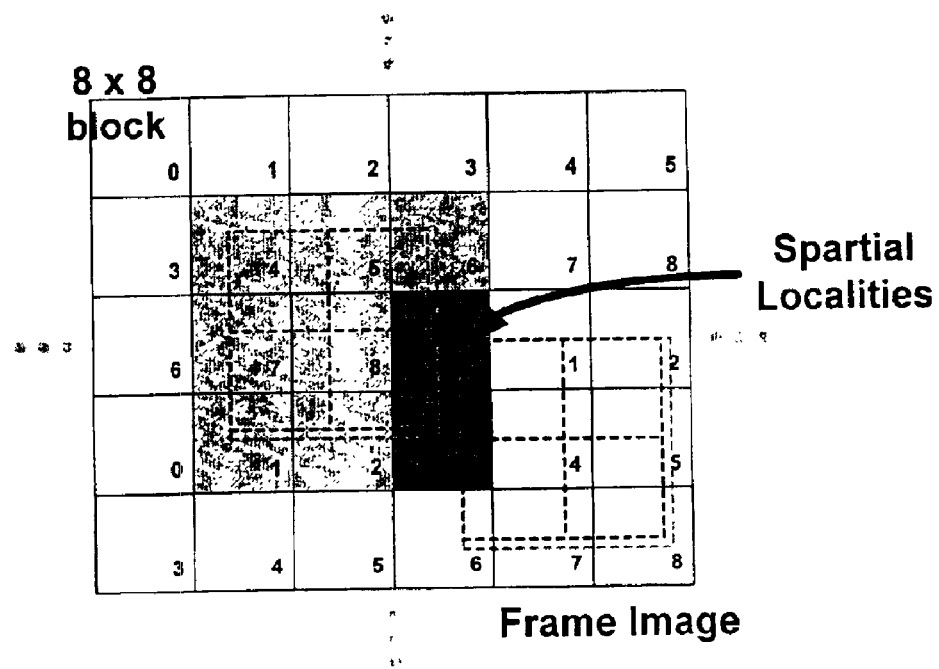
FIG. 4 is a view for illustrating that there is a spatial locality in an activated block to restore a previous data and a current and a region for restoring a current block upon reading a frame buffer for a motion compensation.

FIG. 4 is a view for illustrating that there is a spatial locality between activated blocks to process the previous macro block and blocks that should be activated to process current macro blocks.

Accordingly, if the blocks which have been activated still maintains the activated state until before the collision between columns occurs, the number of times for newly activating the column decreases because of the locality, so that power consumption decreases.

Figure 5:
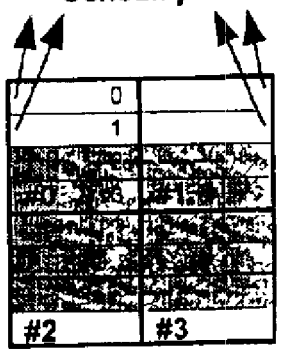
FIG. 5 is a view for illustrating a sub-word line structure of a frame buffer memory in which a partial activation is possible, and for illustrating to realize a low power consumption by constraining the activation for an unnecessary portion through the sub-word line structure.
Figure 5:
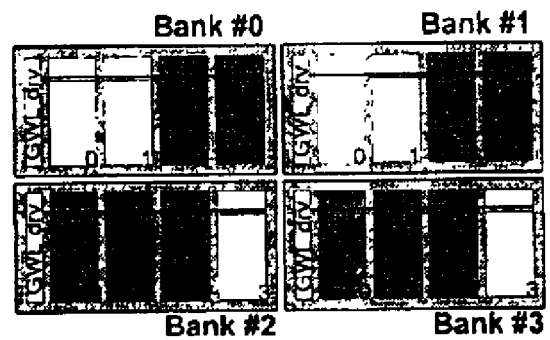
Figure 5:
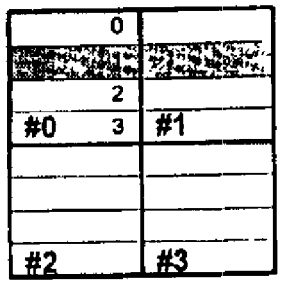
Figure 5:
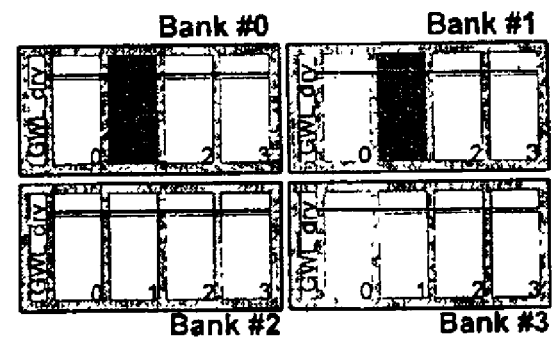

FIG. 5 is a view for illustrating a sub-word line structure of a frame buffer memory in which a partial activation is possible, and for illustrating to realize low power consumption. Since the properties of the motion vector are irregular, only a part of activated blocks data is used for the motion compensation in most cases of activating the blocks, and there are many cases in that the remaining data are unnecessarily activated and then are non-activated.

Accordingly, the blocks are divided into four segments such that a partial activation is possible. Thus, since only the currently necessary portions are activated, the power consumption is constrained. This method is very profitable in a case in which an image transmission to SAM (Serial access memory) occurs when extracting a content of the frame buffer and transmitting the extracted content into an external device.

In other words, in order to extract an image and transfer the extracted image to an output device, there is needed data corresponding to one column, which corresponds to ⅛ of one block data amount. Accordingly, by using the partial activation, activating only ¼ of total blocks and carrying out data transmission causes a power gain of ¾ than activating all blocks.

Then, the partial activation of ⅛ unit is nonrealistic because data of one portion corresponds to 64 bits with respect to one column and total area is largely increased upon realizing it on the frame buffer.

As described previously, the present invention carries out an access to a frame buffer for the motion compensation with a low power consumption in processing a compressed MPEG image signal. Accordingly, the present invention can be applied to appliances such as multimedia handheld apparatus or the like requesting a capability capable of processing an MPEG image signal and a low power consumption characteristic essentially.

While the present invention has been described in detail, it should be understood that various changes, substitutions and alterations could be made hereto without departing from the spirit and scope of the invention as defined by the appended claims.

What is claimed is:

1. A method for storing a compressed MPEG image in a frame buffer, the method comprising:

a first step of dividing an image frame into 8×8 pixel regions;

a second step of re-designating the respective divided pixel regions into 9 adjacent blocks regions having a form of 3×3;

a third step of mapping the 8×8 pixel regions consisting of the 9 adjacent blocks regions having the form of 3×3 into one column; and a fourth step of dispersion-storing the mapped 9 blocks regions of 8×8 pixel regions in different banks.

2. The method of claim 1, wherein the 64 pixels of 8×8 pixel regions each is expressed by 8 bits information, and the one column stores total 512 bits information.

3. The method of claim 1, wherein when there is a need to read total 9 blocks data in order to process data of the adjacent 9 blocks regions having the form of 3×3, the banks of a DRAM are different from each other, a spatial locality for a memory access exists, a collision between columns does not occur, and a number of column activation is decreased.

* * * * *